March 4, 1952 V. R. CLARK 2,588,206
DISPENSER HAVING AN INLET AND AN OUTLET VALVE
FOR MEASURING THE QUANTITIES DISPENSED
Filed July 23, 1947

INVENTOR.
VIRGIL R. CLARK
BY
ATTORNEY

Patented Mar. 4, 1952

2,588,206

UNITED STATES PATENT OFFICE 2,588,206

DISPENSER HAVING AN INLET AND AN OUTLET VALVE FOR MEASURING THE QUANTITIES DISPENSED

Virgil R. Clark, Decatur, Ga.

Application July 23, 1947, Serial No. 762,984

1 Claim. (Cl. 222—349)

The filling of small containers with coffee, tea, sugar, cereals and the like and weighing them on scales so as to contain the exact quantity required has hitherto been a very tedious and laborious task.

An object of my invention is to provide apparatus wherein given quantities of such substances can be measured automatically and filled into bags or other receptacles with much greater economy of time and labor than heretofore.

Another object of my invention is to provide apparatus in which the exact quantity to be dispensed is measured by adjusting the capacity of the measure.

Still another object of my invention is to provide a dispenser which is materially improved and simplified and its operation rendered easy and successful in its action.

All of the foregoing and further objects and advantages of my invention will be apparent from the following description taken in connection with the accompanying drawing wherein like characters of reference designate corresponding parts in the several views, and wherein.

Figure 1:
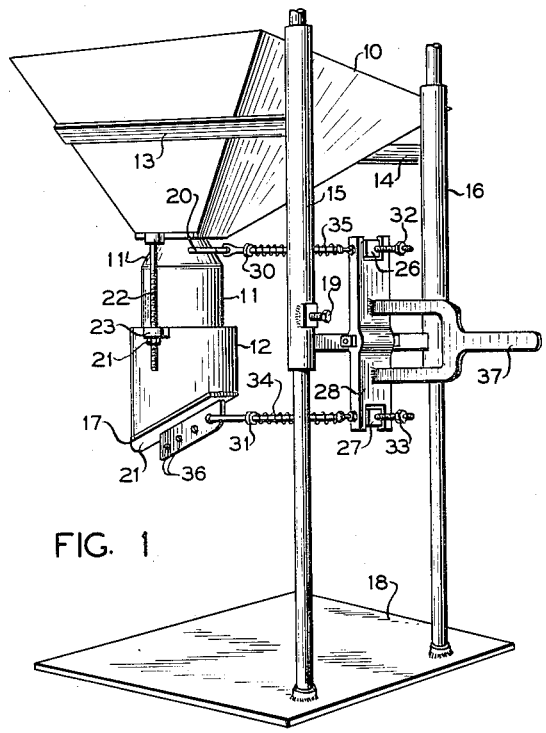
Fig. 1 is a general view of the apparatus in perspective.

In the embodiment illustrated, 10 is a hopper for filling a measure comprising an upper or hood member 11 and a lower or cup member 12. The hood is provided with tapered entrance walls as at 11'.

The measure is suspended from the lower end of the hopper, and the hopper is mounted in any convenient manner, as by horizontal arms 13, 14, upon adjustable supports 15, 16 so as to support the discharge spout 17 of the measure a suitable distance above the base 18. A set screw 19 may be used for fixing the supports in adjusted position.

The flow of material into the measure is controlled by the slide valve 20, and the discharge of the material is controlled by the gate valve 21. These are alternating valves which when one has closed the other opens, and vice versa, so that material is fed into the measure from the hopper 10 and when it is full the inlet valve 20 is closed to cut off the supply and outlet valve 21 is opened to discharge the measured material through the spout 17 into a bag or other receptacle.

Figure 4:
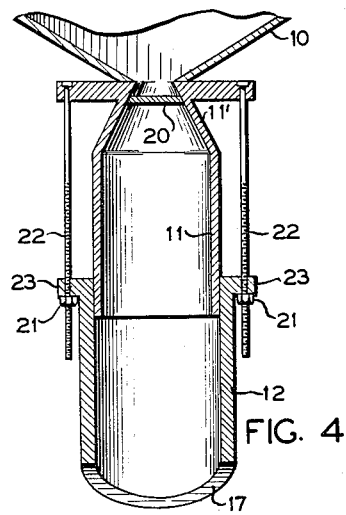
Fig. 4 is a detail cross-section view showing means for adjusting the capacity of the measure.

In order to adjust the capacity of the measure, the cup member 12 is slidable over the lower end of the hood member 11; and the adjustment is maintained, as seen most clearly in Fig. 4, by means of stop-nuts 21 which are adjustable on threaded rods 22 located one on each side of the measure. These rods 22 are fastened in any suitable manner near the top of hood member 11 and in fixed vertical position relative thereto, and they extend through holes in the ears 23 which project one on each side of the measure.

Figure 5:
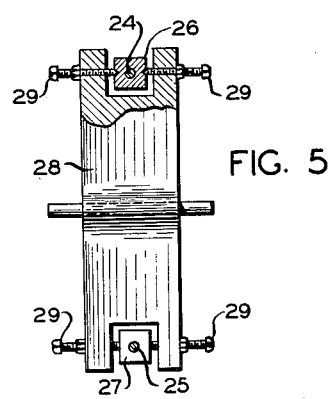
Fig. 5 is a detail view of the valve actuating rocker arm, with parts in cross-section.
Figure 2:
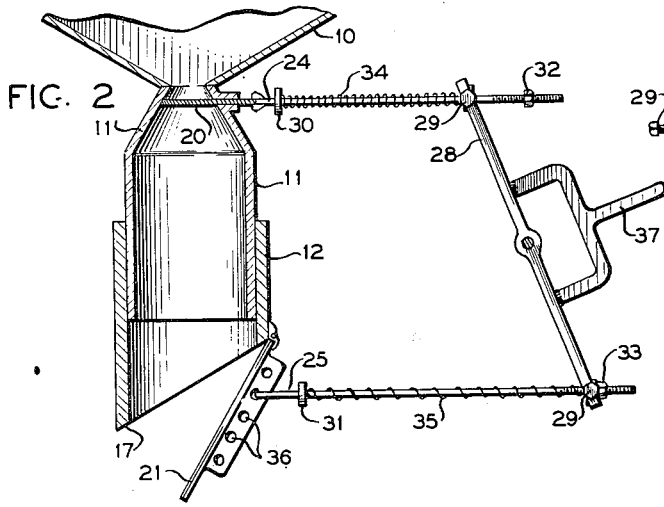
Fig. 2 is a detail view with parts in section and showing the inlet valve closed and the outlet valve open.

The alternating valves 20, 21 are controlled by means of rods 24, 25, fastened thereto, respectively. These rods extend through guides 26, 27, respectively, pivotally mounted in the bifurcated ends of rocker arm 28, on pivot pins 29, as seen most clearly in Fig. 5.

The rods 24, 25 have abutments 30, 31 fixed thereon, respectively, adjacent the end nearest the valves. The opposite ends of rods 24, 25 are threaded to receive nuts 32, 33, respectively. Surrounding rods 24, 25 are coil springs 34, 35, respectively, which are held between the abutments 30, 31 and bosses 26, 27, respectively.

A plurality of holes 36 may be provided for adjusting the swing of outlet valve 21, as desired. A handle 37 is provided for operating the rocker arm 28 to control the valves.

Figure 3:
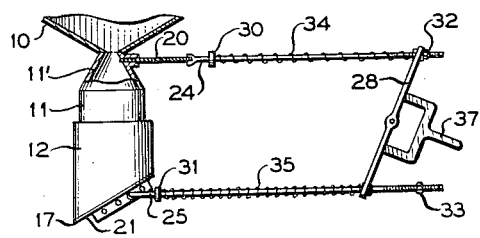
Fig. 3 is a detail view with parts in section and showing the inlet valve open and the outlet valve closed.

In operation, a sack or other receptacle is placed beneath the discharge spout 17. With the handle 37 in the position shown in Fig. 1 both the slide valve 20 and the gate valve 21 are closed, being pressed to the closed position by means of the springs 34 and 35. When the handle 37 is pushed down, as in Fig. 3, slide valve 20 is drawn to open position by means of the guide 26 acting against the nut 32 or rod 24. Simultaneously, the guide 27 further compresses the spring 35 to put additional pressure on the abutment 31 to hold the gate valve securely in closed position. Material from the hopper 10 then flows into the measure. When the measure is full, the handle 37 is raised and this action first closes slide valve 20 by the compression of spring 34 and then opens gate valve 21 by the action of guide 27 against the nut 33 on the rod 25.

It will be noted that both of the valves of my invention are opened by rigid mechanical means, but are spring pressed to the closed position.

This is especially important in the measuring of certain substances which might be crushed if caught in a valve which was forced to closed position by rigid mechanical means. The tension in the valve springs according to my invention can be adjusted to provide sufficient pressure to close the valves securely and yet not crush or damage material being dispensed which might become lodged or caught by the valve.

Having fully described my invention, I claim:

In a dispenser, an adjustable measure arranged to receive and contain the exact quantity to be dispensed, said measure having downwardly and outwardly divergent entrance walls, an inlet valve slidably mounted near the top of said measure to operate in conjunction with said divergent walls, an outlet valve mounted near the bottom of said measure, means for controlling said inlet valve and said outlet valve so that said inlet valve is closed before said outlet valve is opened and, alternately, so that said outlet valve is closed before said inlet valve is opened, said means comprising a rocker arm having bifurcated ends, an operating handle rigidly connected to said rocker arm, a guide pivotally mounted in each of said bifurcated ends, valve rods connected to said valves and slidably mounted in said guides, a spring coiled around each of said rods and held between an abutment on each of said rods and the guide in which said rod is mounted for pressing said valves to closed position, and means on the outer end of said rods cooperating with said guides for positively opening said valves.

VIRGIL R. CLARK.

REFERENCES CITED

The following references are of record in the file of this patent:

UNITED STATES PATENTS

| Number  | Name     | Date          |
|---------|----------|---------------|
| 350,503 | Richards | Oct. 12, 1886 |
| 868,641 | Clark    | Oct. 22, 1907 |